US007394765B2

(12) United States Patent
Yi et al.

(10) Patent No.: US 7,394,765 B2
(45) Date of Patent: Jul. 1, 2008

(54) METHOD OF MEASURING TRAFFIC VOLUME IN MOBILE COMMUNICATION SYSTEM

(75) Inventors: Seung June Yi, Seoul (KR); Jin Young Park, Kunpo-shi (KR)

(73) Assignee: LG Electronics Inc., Seoul (KR)

( * ) Notice: Subject to any disclaimer, the term of this patent is extended or adjusted under 35 U.S.C. 154(b) by 918 days.

(21) Appl. No.: 10/076,510

(22) Filed: Feb. 19, 2002

(65) Prior Publication Data
US 2002/0114280 A1 Aug. 22, 2002

(30) Foreign Application Priority Data
Feb. 20, 2001 (KR) ............... 2001-0008526

(51) Int. Cl.
*G01R 31/08* (2006.01)
*G06F 11/00* (2006.01)
*G08C 15/00* (2006.01)

(52) U.S. Cl. ............... 370/235; 370/328; 370/412
(58) Field of Classification Search ............ 370/328, 370/235
See application file for complete search history.

(56) References Cited

U.S. PATENT DOCUMENTS

| | | | | |
|---|---|---|---|---|
| 5,673,259 | A * | 9/1997 | Quick, Jr. ............ | 370/342 |
| 6,414,943 | B1 * | 7/2002 | Hwang et al. ......... | 370/310 |
| 6,442,220 | B1 * | 8/2002 | Sihlbom ............ | 375/343 |
| 6,553,540 | B1 * | 4/2003 | Schramm et al. ....... | 714/790 |
| 6,640,105 | B1 * | 10/2003 | Shin ................ | 455/453 |

FOREIGN PATENT DOCUMENTS

| | | |
|---|---|---|
| EP | 1 069 790 A2 | 1/2001 |
| EP | 1069790 A2 * | 1/2001 |

OTHER PUBLICATIONS

3GPP TS 25.321: "Technical Specification Group Radio Access Network"; MAC protocol specification; Sep. 2001; pp. 1-45.
3GPP TSG-RAN WG2 25.331 CR 646; "Traffic Volume Measurement Corrections"; R2-010606; Feb. 2001; pp. 1-14.
3GPP TSG-RAN WG2 25.321 CR 068; "Clarification on Traffic Volume Measurement Procedure"; R2-010686; Feb. 2001; pp. 1-9.

(Continued)

*Primary Examiner*—Wing Chan
*Assistant Examiner*—Blanche Wong
(74) *Attorney, Agent, or Firm*—Lee, Hong, Degerman, Kang & Schmadeka

(57) ABSTRACT

A method for measuring the traffic volume of a transport channel in a mobile communication system is disclosed, including receiving a buffer occupancy for each of a set of logical channels mapped to a transport channel, measuring a traffic volume of the transport channel based on the received buffer occupancies, and reporting the measured traffic volume of the transport channel to an upper layer. The measured traffic volume may be reported to the upper layer when the volume is out of a given range or a timer set to a given period has expired. Using this method, a radio resource control layer can perform a dynamic radio bearer reconfiguration using the measurement results received from a medium access control layer of the communication system.

25 Claims, 5 Drawing Sheets

OTHER PUBLICATIONS

3GPP TSG-RAN WG2 25.331 CR 646; "Traffic Volume Measurement Corrections"; R2-010330; Feb. 2001; pp. 1-14.

3GPP TSG-RAN WG2 25.922 CR 013; "Radio Bearer Control Corrections"; R2-010605; Feb. 2001.

ETSI TS 125 331 v 3.1.0 (Jan. 2000) "Universal Mobile Telecommunications System (UMTS); RRC Protocol Specification" (3G TS 25.331 version 3.1.0 Release 1999) XP-002165164.

Ericsson, TSG-RAN Working Group 2 (Radio Layer 2 and Radio Layer 3), "Usage of Radio Access Bearer Control Procedures," Stockholm, Mar. 8-11, 1999, TSGR2#2(99)141, XP-002251103.

3GPP TS 25.303 v3.6.0 (Dec. 2000), "3$^{rd}$ Generation Partnership Project; Technical Specification Group Radio Access Network; Interlayer Procedures in Connected Mode," (Release 1999) XP-002263252.

* cited by examiner

METHOD OF MEASURING TRAFFIC VOLUME IN MOBILE COMMUNICATION SYSTEM

BACKGROUND OF THE INVENTION

This application claims the benefit of the Korean Patent Application No. P2001-08526 filed on Feb. 20, 2001, which is hereby incorporated by reference.

1. Field of the Invention

The present invention relates to a mobile communication system and, more particularly, to a method for measuring the traffic volume of transport channels in a mobile communication system.

2. Background of the Related Art

A medium access control (MAC) layer is included in a second protocol layer of a b $3^{rd}$ generation partnership project (3GPP) architecture, which is one of the advanced network/wireless access systems, and it corresponds to a second layer of an open systems interconnection (OSI) 7-layer system. FIG. 1 illustrates the layers of a mobile communication system, including logical channels and transport channels. As shown in FIG. 1, the second layer (L2) of the 3GPP includes a packet data convergence protocol (PDCP) layer 210, a broadcast/multicast control (BMC) layer 220, and a radio link control (RLC) layer 230. In addition, the first and third layers of the 3GPP include a physical (PHY) layer 300 and a radio resource control (RRC) layer 100, respectively.

MAC layer 240 and RLC layer 230 are connected through logical channels (L_CH), and similarly, transport channels (T_CH) connect MAC layer 240 and PHY layer 300. MAC layer 240 maps the logical channels (L_CH) to the transport channels (T_CH) and selects the transport format combinations (TFC) of the transport channels, which are multiplexed based on the mapping source rate.

RLC layer 230 transmits the data stored in each RLC entity to MAC layer 240 through the logical channels, which are classified based on the type of each data set. MAC layer 240 transmits data received from RLC layer 230 to physical layer 300 through transport channels, which are classified based on the characteristics of the physical channels. Physical layer 300 converts the transport blocks received through the transport channels into frames and sends the frames through the physical channels. The transport format of data transmitted from MAC layer 240 to physical layer 300 is the information format of the transport blocks.

To enable RRC layer 100 to dynamically allocate radio resources based depending on the amount of data traffic, MAC layer 240 measures the data traffic volume of the transport channels and reports the measured traffic volume information to RRC layer 100. RRC layer 100 initially provides the lower and upper limits of the volume or the period information to MAC layer 240. These limits are used by MAC layer 240 when it measures the traffic volume of each transport channel in a periodic mode or an event triggered mode. If the system is set to the event triggered mode, MAC layer 240 reports the event to RRC 100 layer when the measured traffic volume is greater than the upper limit or less than the lower limit. For the periodic mode, MAC layer 240 periodically reports the measured traffic volume information to RRC 100 when a timer set to a given period expires.

As described above, regarding the background radio interface protocol structure, MAC layer 240 monitors the data traffic volume of RLC layer 230 to enable RRC layer 100 to properly allocate its radio resources. However, an actual embodiment of the structure is not standardized yet. In other words, the 3 GPP radio access network (RAN) standards simply state that the MAC layer measures the traffic volume and reports the measurement result to the RRC layer. The standards do not state the detailed processes of such measuring and reporting steps. For example, some processes/steps that need to be developed in detail are whether to perform the measurement and reporting on a radio bearer basis, on a logical channel basis, or on a transport channel basis; whether to include control protocol data units (Control PDUs) in the measured traffic volume; and what measurement will be used to compare with the upper/lower limits in the event triggered mode, etc. If such processes or steps are not described in detail, it will lead to great confusion in manufacturing the 3GPP systems and the related mobile stations.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the present invention is directed to a method of measuring the data traffic volume of transport channels, in a mobile communication system, that substantially obviates one or more problems due to limitations and disadvantages of the background art.

Another object of the present invention is to provide a method of measuring the data traffic volume of transport channels in a mobile communication system, in which a medium access control layer measures the traffic volume based on basic measurement information received from a radio resource control layer.

To achieve these objects and other advantages and in accordance with the purpose of the invention, as embodied and broadly described herein, a method for measuring traffic volume of a transport channel in a mobile communication system includes measuring buffer occupancies of one or more radio bearers mapped to a transport channel; calculating a traffic volume of a transport channel by obtaining a total sum of the buffer occupancies; and reporting measurement results for the one or more radio bearers mapped to the transport channel.

In another aspect of the present invention, a method for measuring traffic volume of transport channels in a mobile communication system includes receiving measurement information from an upper layer, wherein the information includes a reporting period; measuring buffer occupancies of one or more radio bearers mapped to each of a set of transport channels; checking whether the reporting period is expired; and sending a measurement report to the upper layer for each radio bearer mapped to every transport channel, if the reporting period is expired.

In another aspect of the present invention, a method for measuring traffic volume of transport channels in a mobile communication system includes receiving measurement information from an upper layer, wherein the information includes a range of permissible traffic volume for a transport channel; measuring buffer occupancies of one or more radio bearers mapped to a transport channel, included in the communication system; calculating a traffic volume of a transport channel by obtaining a total sum of the buffer occupancies; and sending a measurement report to the upper layer for each radio bearer mapped to a transport channel whose traffic volume is out of the range.

The objects of the present invention may be achieved in whole or in part by a method of measuring traffic volume of a transport channel, including measuring a buffer usage of each of one or more radio bearers mapped to the transport channel, summing the measured buffer usage for the one or more radio bearers; and reporting the summed buffer usage for the transport channel to an upper protocol layer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
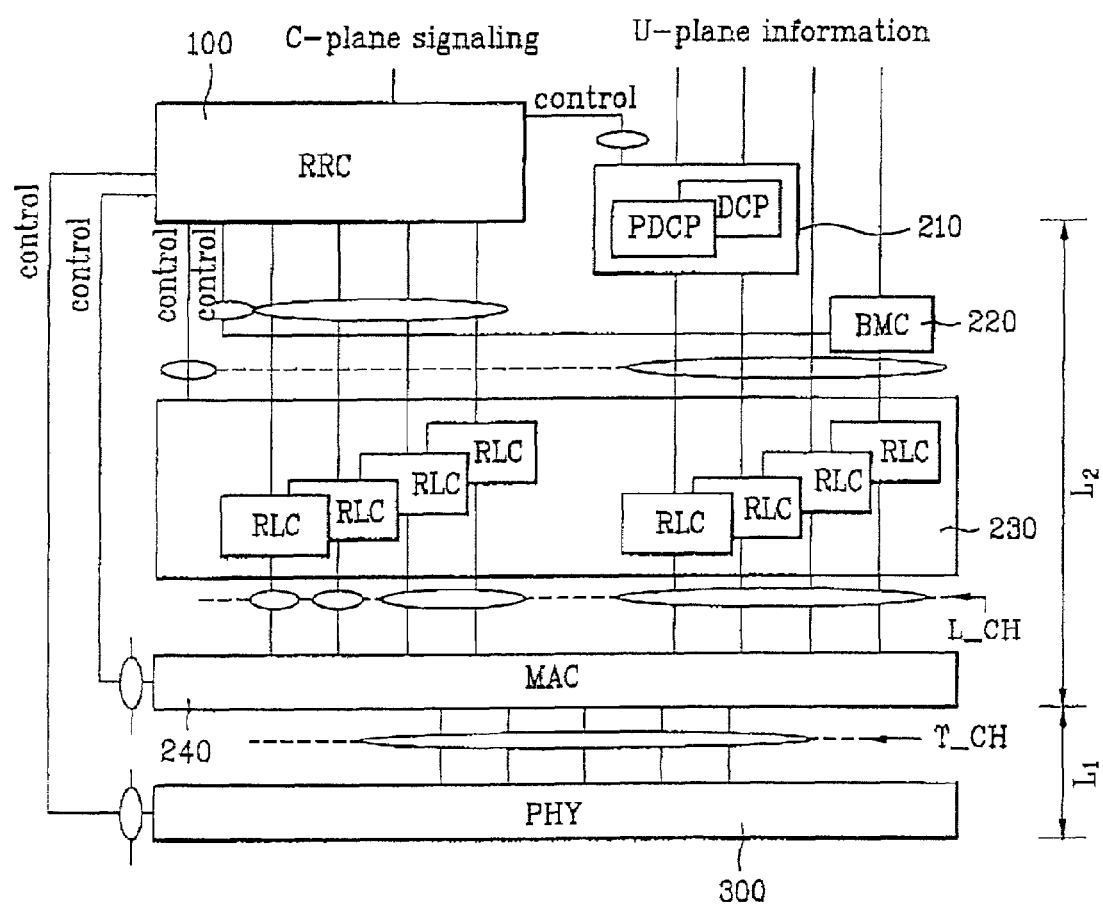
FIG. 1 illustrates layers of a background art mobile communication system, including logical channels and transport channels.
Figure 2:
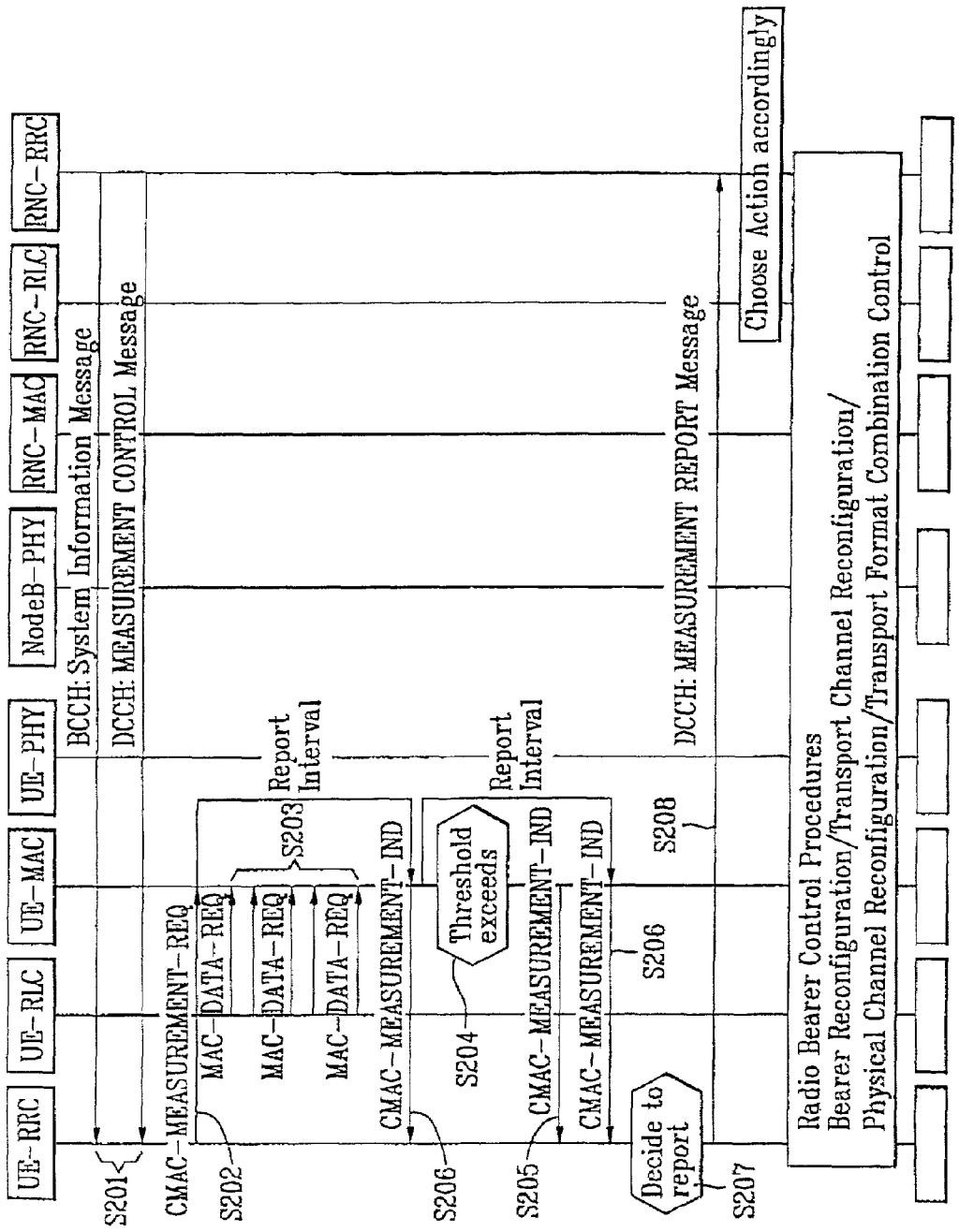
FIG. 2 illustrates a signal flow between a radio network controller (RNC) and a user equipment (UE) in a mobile communication system, wherein the UE measures the data traffic volume.

FIG. 2 illustrates a signal flow between a radio network controller (RNC) and a user equipment (UE) in a mobile communication system, wherein the UE measures the data traffic volume. A radio resource control (RRC) layer of the RNC (RNC-RRC) initially sends a system information message, which is related to the traffic volume measurement, to a radio resource control (RRC) layer of the UE (UE-RRC) (S201). The message indicates whether the traffic volume should be measured in an event triggered mode or a periodic mode. It further includes lower and upper critical limits for the event triggered measurement or the corresponding period for the periodic mode measurement.

After the UE-RRC receives the system information message, it reports to a medium access control (MAC) layer of the UE (UE-MAC) (S202). The UE-MAC layer measures the data traffic volume, after receiving data, and a corresponding buffer occupancy from a radio link control (RLC) layer of the UE (UE-RLC) (S203). When the UE-MAC measures the traffic volume in an event triggered mode, it determines the data traffic volume of each transport channel by obtaining the sum of the buffer occupancies of the logical channels mapped to the transport channel. Thereafter, the UE-MAC compares the sum with a predetermined range (lower and upper limits). If the determined sum is out of the range (S204), the UE-MAC reports to the UE-RRC by creating an event (S205). On the other hand, when the UE-MAC measures the traffic volume in a periodic mode, it reports to the UE-RRC when each period is elapsed (S206). When the UE-RRC makes the decision to report the measurement result to the RNC-RRC (S207), it sends a measurement report message to RNCRRC (S208).

Figure 3:
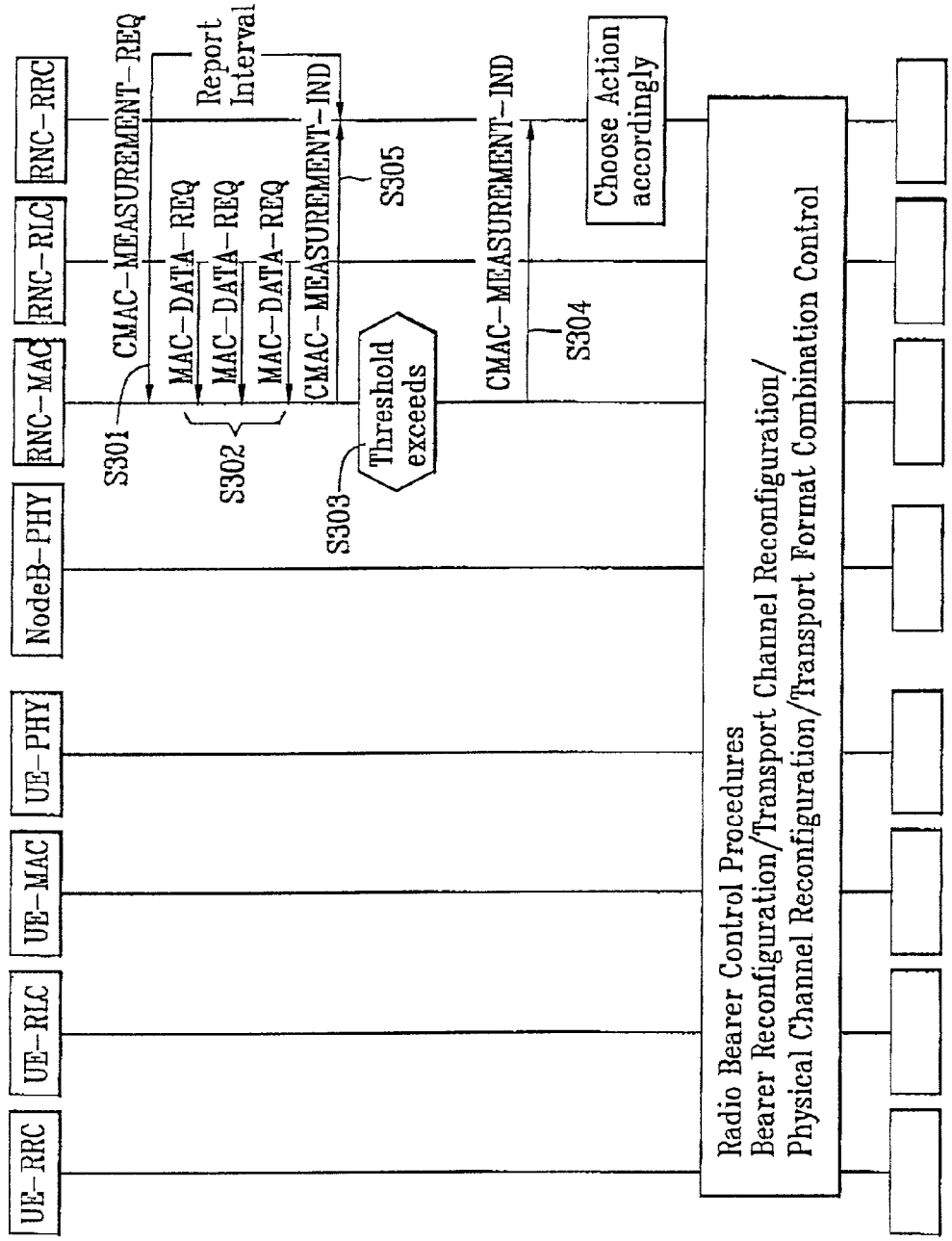
FIG. 3 illustrates a signal flow between a radio network controller (RNC) and a user equipment (UE) in a mobile communication system, wherein the RNC measures the data traffic volume.

FIG. 3 illustrates a signal flow between an RNC and a UE in a mobile communication system, wherein the data traffic volume is measured by the RNC side, instead of the UE side. The RNC-RRC initially sends a measurement request message to the RNC-MAC (S301). Thereafter, the RNC-MAC measures the traffic volume, after receiving data from the RNC-RLC layer (S302).

When the RNC-MAC measures the traffic volume in an event triggered mode, it determines the data traffic volume of each transport channel by obtaining the sum of the buffer occupancies of the logical channels mapped to the transport channel. Then, the RNC-MAC compares the sum with a predetermined range (lower and upper limits). If the determined sum is out of a predetermined range (S303), the RNC-MAC reports to the RNC-RRC layer by creating an event (S304). On the other hand, when the RNC-MAC measures the traffic volume in a periodic mode, it reports the measurement results to the RNC-RRC when each period is elapsed (S305).

Figure 4:
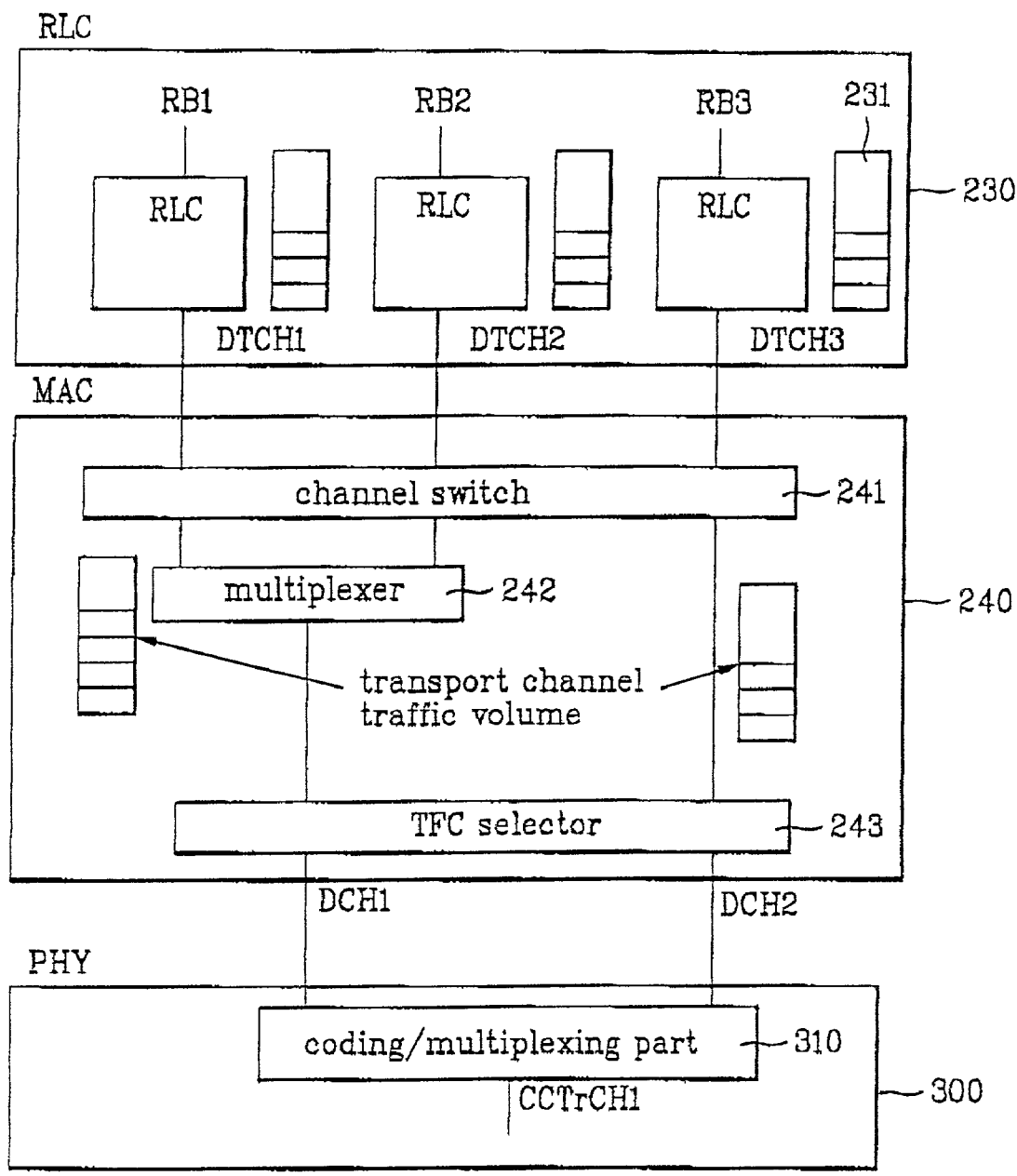
FIG. 4 illustrates an apparatus for measuring the data traffic volumes of transport channels in a mobile communication system, according to the present invention.
Figure 5:
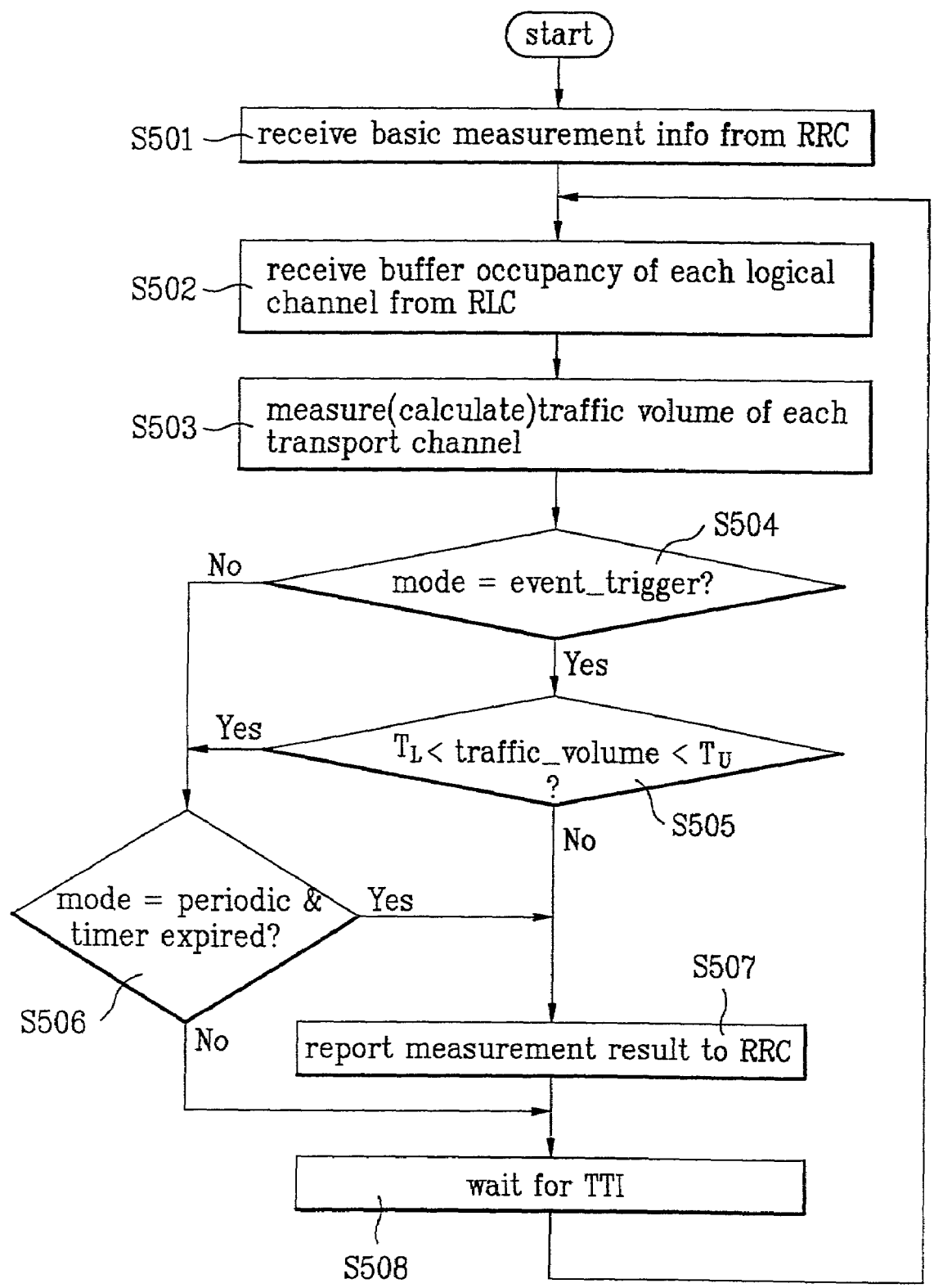
FIG. 5 illustrates a method for measuring the data traffic volumes of transport channels in a mobile communication system, according to the present invention.

The event triggered mode and the periodic mode of the present invention will now be described in greater detail, in reference to FIG. 4 and FIG. 5. FIG. 4 and FIG. 5 illustrate an apparatus and a method for measuring the data traffic volume in a mobile communication network according to the present invention. An RRC layer initially sends basic measurement information to MAC layer 240 (S501). MAC layer 240 uses this information to dynamically allocate the radio resources based on the amount of data traffic being transmitted. The basic measurement information includes a desired measurement mode (event triggered/periodic), a measuring time interval used to calculate an average or a variance, a reporting interval (for periodic mode), and lower and upper limit values $(T_L, T_U)$ (for event triggered mode).

When each radio bearer RB1, RB2, and RB3 is set in RLC layers 230, channel switch 241 of MAC layer 240 switches each logical channel DTCH1, DTCH2, and DTCH3 to correspond to a radio bearer, and TFC selector 243 maps each logical channel to a corresponding transport channel DCH1 or DCH2. In other words, multiplexer 242 may multiplex more than one logical channel DTCH1 and DTCH2, and TFC selector 243 maps the multiplexed logical channels to a transport channel DCH1. Also, TFC selector 243 maps a logical channel DTCH3 to a transport channel DCH2.

In addition, RLC layer 230 informs MAC layer 240 of the amount of Data protocol data units (Data PDUs) stored in the buffer of each RLC entity, and also the amount of control protocol data units (Control PDUs) that could exist in RLC layer 230. MAC layer 240 eventually uses this information for selecting a proper transport format combination (TFC).

Coding/multiplexing part 310 of physical layer 300 codes and multiplexes the transport channels to generate a coded composite transport channel (CCTrCH). The CCTrCH then gets mapped to a physical channel of physical layer 300.

Multiplexer 242 can map more than one logical channel to a single transport channel or map a single logical channel to a single transport channel. The traffic volume of each transport channel can be determined by measuring the traffic volume(s) being multiplexed in each transport channel for each transmission time interval (TTI).

In addition, the traffic volume of a transport channel can be simply calculated by obtaining the sum of the buffer occupancies of the logical channels mapped into the transport channel (S502). Therefore, MAC layer 240 checks the data traffic volume of each transport channel (S503). Alternatively, the traffic volume of the transport channel can be calculated by obtaining the sum of the buffer occupancies of RLC layer 230 (S503). Each buffer occupancy includes the amount of Data PDUs stored in the buffer and the amount of Control PDUs being generated.

When the data traffic volume is measured in an event triggered mode (S504), the measured traffic volume of each transport channel will be compared with the lower and upper limits ($T_L$, $T_U$) (S505), which are previously set for each transport channel. If the traffic volume of a transport channel is greater than the upper limit $T_U$ or is less than the lower limit $T_L$, MAC layer 240 will create an event, in which it reports the measurement result to the RRC layer (S507). For example, the RRC layer may select the upper and lower limits among the values of 8, 16, 32, . . . , 512K, and 768K bytes. By enabling MAC layer 240 to report the traffic volume of each transport channel to the RRC layer, the RRC layer can reflect the measurement results when switching the transport channels.

According to the background art method, when an event occurs for each radio bearer, the traffic volume being multiplexed to each transport channel is calculated using the bearer values being reported to the RRC layer. This process takes more time and involves great complexity. Therefore, it is much more efficient for MAC layer 240 to determine the traffic volume of each transport channel, rather than the RRC layer.

If the communication system is set to a periodic mode (S506), the traffic volume of each transport channel will be measured and reported periodically (S507). In other words, each time a timer set to a given period expires, the traffic volume measurement will be performed and reported, and the timer will be reset. In addition, the same timer will be preferably used for all of the transport channels. This means that the traffic volumes of all the transport channels will be measured and reported at same time. The RRC layer provides the required period (e.g., 250, 500, . . . , 32000, 64000 milliseconds) to MAC layer 240, and MAC layer 240 measures the traffic volume of each transport channel and makes a report for each period (S508).

When MAC layer 240 reports the traffic volume measurements to the RRC layer, without being set to either the event triggered or periodic modes, the report should include the total amount of data in the RLC buffer of each radio bearer (RB) and the average and variance information corresponding to each RB.

According to the current standards, both the event triggered and periodic modes can be used simultaneously for measuring and reporting the data traffic volume information of the transport channels. Alternatively, each mode can be used independently.

After MAC layer 240 reports the traffic volume measurement, when an event occurs, the RRC layer receives the measurement results for each RB and performs a quantization to reduce the transmission rate. Therefore, the RRC layer can perform dynamic RB reconfiguration based on the information received from MAC layer 240. In other words, the RRC layer performs RB, transport channel, and physical channel reconfiguration. Additionally, the RRC layer reconfigures transport format combination controls based on the measurement results.

As described above, MAC layer 240 receives the measurement control message including the upper and lower limits and the desired period from its upper layer (RRC layer). The information included in the measurement control message indicates whether the system is set to an event triggered mode or a periodic mode. Other information, such as upper/lower limits and the period, is included as well. This will enable both the user equipment and the network to measure the traffic volume of the transport channels.

According to the present invention, when there exists an extremely large amount of traffic in the transport channel corresponding to a certain radio bearer, the RRC layer performs the radio bearer reconfiguration so that the radio bearer can be mapped to one or more other available transport channels. Additionally, the RRC layer can perform channel type switching, such as converting a common transport channel containing a large amount of traffic volume into a dedicated transport channel.

In conclusion, MAC layer 240 can enable the RRC layer to reflect the measurement results, when it performs the channel type switching of the transport channels, by creating events that depend on the comparison between the measured traffic volume and the predetermined critical limits. When an event occurs in an event triggered mode, or each period expires in a periodic mode, MAC layer 240 sends a traffic volume measurement message that includes the buffer occupancy, and its corresponding average and variance values, of each radio bearer to the RRC layer. Thereafter, the RRC layer can perform the dynamic radio bearer reconfiguration.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A traffic volume measurement method for controlling at least one radio bearer, comprising:
   receiving, from an upper layer, measurement information including lower and upper values of permissible traffic volume for a transport channel;
   receiving buffer occupancy from a radio link control (RLC) layer for each logical channel related to the transport channel, the buffer occupancy for each logical channel related to the transport channel including an amount of data protocol data units (PDUs) stored in the buffer and an amount of control PDUs being generated;
   measuring traffic volume for the transport channel by summing the buffer occupancy for each logical channel related to the transport channel;
   comparing the measured traffic volume to the lower or upper value; and
   reporting buffer occupancy information to the upper layer, if the measured traffic volume is larger than the upper value or lower than the lower value.

2. The method of claim 1, wherein the buffer occupancy information reported to the upper layer includes buffer occupancy information for each of the at least one radio bearer mapped to the transport channel.

3. The method of claim 1, wherein each operation of the method is performed by a media access control (MAC) entity.

4. The method of claim 1, wherein the buffer occupancy information includes at least one of a buffer occupancy, an average of buffer occupancy, and a variance of buffer occupancy, for each of the at least one radio bearer.

5. The method of claim 1, wherein the measurement of the traffic volume is performed every transmission time interval (TTI).

6. The method of claim 4, wherein the buffer occupancy for each logical channel related to the transport channel represents an occupancy of an RLC buffer of an RLC entity.

7. The method of claim 5, wherein the measurement information further includes a time interval for calculating at least one of an average and a variance of the buffer occupancy for each logical channel related to the transport channel.

8. The method of claim 1, wherein the upper layer is a radio resource control (RRC) layer.

9. A traffic volume measurement method for controlling at least one radio bearer, comprising:
   receiving measurement information including a reporting period from an upper layer;
   receiving buffer occupancy for each logical channel related to a transport channel from a radio link control (RLC) layer, the buffer occupancy for each logical channel related to the transport channel including an amount of data protocol data units (PDUs) stored in the buffer and an amount of control PDUs being generated;
   reporting buffer occupancy information to the upper layer when reporting period elapses.

10. The method of claim 9, wherein each operation of the method is performed by a media access control (MAC) entity.

11. The method of claim 9, wherein the buffer occupancy information reported to the upper layer includes buffer occupancy information for each of the at least one radio bearer mapped to the transport channel.

12. The method of claim 9, wherein the buffer occupancy information includes at least one of a buffer occupancy, an average of buffer occupancy, and a variance of buffer occupancy, for each of the at least one radio bearer.

13. The method of claim 9, wherein the buffer occupancy for each logical channel related to the transport channel represent an occupancy of an RLC buffer of an RLC entity.

14. The method of claim 9, wherein the upper layer is a radio resource control (RRC) layer.

15. The method of claim 9, wherein the measurement information further includes a time interval for calculating at least one of an average and a variance of the buffer occupancy for each logical channel related to the transport channel.

16. A method of controlling at least one radio bearer, comprising:
   transferring measurement information to a media access control (MAC) entity, the measurement information including information on whether to perform an event-triggered measurement mode or a periodic measurement mode;
   receiving buffer occupancy information from the MAC entity according to the measurement mode, the buffer occupancy information being obtained by using buffer occupancy of each logical channel mapped to a transport channel, wherein the buffer occupancy includes an amount of data protocol data units (PDUs) stored in the buffer and an amount of control PDUs being generated; and
   performing reconfiguration of the at least one radio bearer based on the buffer occupancy information.

17. The method of claim 16, wherein the buffer occupancy information includes buffer occupancy information for each of the at least one radio bearer mapped to the transport channel.

18. The method of claim 16, wherein, when the measurement mode is the event-triggered measurement mode, the measurement information further includes an upper limit and a lower limit.

19. The method of claim 16, further comprising:
   measuring traffic volume by summing buffer occupancy of each logical channel mapped to a transport channel; and
   comparing the measured traffic volume to the upper limit or the lower limit.

20. The method of claim 19, wherein the measuring and comparing operations are performed in the MAC entity.

21. The method of claim 16, wherein, when the measurement mode is the periodic measurement mode, the measurement information further includes a reporting period.

22. The method of claim 17, further comprising checking whether a reporting period is elapsed in the MAC entity.

23. The method of claim 16, wherein each operation of the method is performed in a radio resource control (RRC) layer.

24. The method of claim 16, wherein the buffer occupancy information includes at least one of a buffer occupancy, an average of buffer occupancy, and a variance of buffer occupancy, for each radio bearer.

25. The method of claim 16, wherein the buffer occupancy of each logical channel mapped to the transport channel is transmitted from a radio link control (RLC) layer to the MAC entity.

* * * * *